Figure 1:
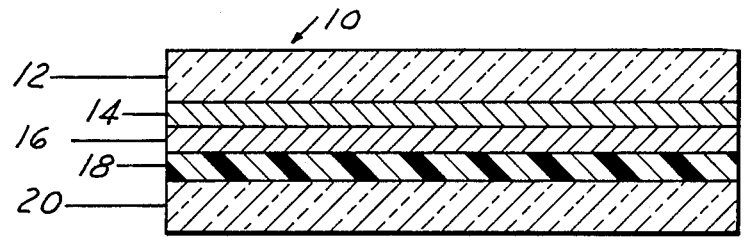

United States Patent [19]

Boulos et al.

[11] Patent Number: 4,771,167

[45] Date of Patent: Sep. 13, 1988

[54] METHOD OF INCREASING THE VISIBLE TRANSMITTANCE OF AN ELECTRICALLY HEATED WINDOW AND PRODUCT PRODUCED THEREBY

[75] Inventors: Edward N. Boulos, Troy; Patricia B. Reid, Detroit; Mark F. Best, Taylor, all of Mich.

[73] Assignee: Ford Motor Company, Dearborn, Mich.

[21] Appl. No.: 96,567

[22] Filed: Sep. 14, 1987

[51] Int. Cl.$^4$ .............................................. H05B 3/10
[52] U.S. Cl. ..................................... 219/547; 156/99; 219/203; 219/522; 338/308
[58] Field of Search ............... 219/203, 522, 543, 547; 338/308, 309; 156/99, 319

[56] References Cited

U.S. PATENT DOCUMENTS

| | | | |
|---|---|---|---|
| 4,017,661 | 4/1977 | Gillery | 219/522 X |
| 4,161,560 | 7/1979 | Kienel | 350/409 X |
| 4,543,466 | 9/1985 | Ramus | 219/203 |

Primary Examiner—C. L. Albritton
Attorney, Agent, or Firm—William E. Johnson; Clifford L. Sadler

[57] ABSTRACT

Methods of making electrically heated windows (10, 100) and products produced thereby. In an embodiment of the method of our invention for producing a product of laminated construction (10), a pair of glass sheets (12, 20) are laminated together by an interposed laminated interlayer (18). This lamination is carried out in a manner that a first (12) of the pair of glass sheets defines both a first glass surface forming the outer surface of the window and a second glass surfaces in juxtaposition with the laminating interlayer, and a second (20) of the pair of glass sheets defines both a third glass surface in juxtaposition with the laminating interlayer and a fourth glass surface forming the inside surface of the window. An electrically conductive coating (16) is formed in association with one of the glass surfaces in juxtaposition with the laminating interlayer. The product is improved by carrying out in the method of manufacturing the same the step of forming at least one sol-gel antireflective coating (14) on at least one of the glass surfaces other than the first glass surface. The sol-gel antireflective coating improves the overall transmittance of light in the visible wavelength through the electrically heated window. The specification describes several different embodiments for both the method of the invention and the product produced thereby.

14 Claims, 1 Drawing Sheet

METHOD OF INCREASING THE VISIBLE TRANSMITTANCE OF AN ELECTRICALLY HEATED WINDOW AND PRODUCT PRODUCED THEREBY

TECHNICAL FIELD

The invention disclosed herein is a method of increasing the visible transmittance of an electrically heated window and product produced thereby. In particular, the invention is directed to such a method wherein the visible transmittance of an electrically heated window having a conductive coating thereon is increased. The conductive coating is one which will generate heat when electrical energy is flowed therethrough. The heat so-generated is used to deice and defog the window. The invention has particular utility for making windows which serve as electrically heated windshields for automotive vehicles.

BACKGROUND AND PROIR ART STATEMENT

Motor vehicles, as presently manufactured, are equipped with systems for defogging and deicing windshields associated therewith. Generally, the defogging and deicing systems depend upon heat generated in the internal combustion engine of the vehicle and subsequently transferred to the engine's cooling system. This heat generated by operation of the internal combustion engine is blown as warm air across the interior of the windshield to accomplish a defogging and/or deicing thereof.

In such a case, that is, when heat generated in the internal combustion engine is used for defogging and/or deicing, it is apparent that such operation will take a period of time before it can be completed because of the inherent delay built into the process. The delay occurs because there is a period of time between the starting of an internal combustion engine and the time that sufficient heat is being generated in its cooling system to provide the heat required for defogging and/or deicing of the vehicle's windshield. Depending upon the exact temperature conditions, the amount of buildup of frozen material on the windshield, and the time the vehicle has been sitting idle without its engine running, the period before sufficient heat is available from the engine's cooling system can be up to 10 minutes or more.

In view of the fact that there can be a rather lengthy delay before the present-day vehicle's heating and defrosting system can clear a windshield from material which is frozen thereon, more effective systems have been sought. Recently, automotive designers have designed systems which generate heat from electrical energy to accomplish a relatively rapid defrost and/or deicing of a vehicle's windshield. An electrically heated defrosting and deicing system of this type is now found on vehicles produced by Ford Motor Company. Such an electrically heated defrosting and deicing system is independent of the normal heating and defrosting system found in the motor vehicle.

Heat which is used for an electrically heated defrosting and deicing system for a windshield is generated by flowing an electric current through a conductive coating which has been applied to a surface of the windshield. U.S. Pat. No. 4,543,466 which issued on Sept. 24, 1985 for "Bus Bar Arrangement for Uniformly Heating a Trapezoidally-Shaped Electrically Heated Windshield", discloses a construction for an electrically heated windshield. This patent is assigned to Ford Motor Company. The patent teaches that the windshield's electrically conductive coating may be applied, for example, by a magnetron sputtering operation in which layers of metallic-containing materials are applied to a selected surface of the windshield. Suitable electrical connection to the coating materials provides the electrical path through which electrical current may be passed through the conductive coating.

As taught in the aforementioned U.S. Pat. No. 4,543,466, the materials used as target materials in the magnetron sputtering device for generating the electrically conductive coating are zinc and silver. The resulting coating applied to a selected surface of the windshield is a multilayer coating consisting of a layer of silver between layers of zinc oxide. Normally, this conductive coating is applied to the inside of the surface of the glass sheet which defines the outside of a laminated glass windshield. In particular, the surface selected for application of the conductive coating is the surface of the outer glass sheet which is bonded to a laminating interlayer to form the laminated windshield.

The application of this conductive coating, however, changes the transmittance value of the overall windshield. In other words, as more and more coating material is applied to the windshield to form the conductive coating, the windshield will transmit therethrough less and less light in the visible wavelength range. This reduction in transmittance also occurs with the placement of other types of conductive coatings for forming electrically heated windows.

In accordance with United States laws, the transmittance of a window used as a windshield for a motor vehicle must be at least 70% in the visible spectrum. Thus, the thickness of the conductive coating which insures the transmittance of the windshield is above that required by law, in turn dictates the amount of current which may flow therethrough to generate heat for the windshield. For example, if increasing the thickness of the conductive coating rapidly decreases the transmission of light in the visible spectrum therethrough, then the conductive coating must remain relatively thin so that the overall transmittance of the windshield in the visible spectrum remains at least 70% or more. However, if the coating is relatively thin, then the amount of current which can flow therethrough per unit of time is also limited and as a result the heating of the windshield for defogging and/or deicing purposes will take a longer period of time.

In accordance with our inventive method and product produced thereby, we improve the transmittance of a window in the visible transmittance range even though it has an electrically conductive coating thereon. This results in either one of two benefits. As a first benefit, we can achieve a higher transmittance through a window having a given thickness of electrically conductive coating thereon. As a second benefit, we may keep the same visible transmittance in a window and increase the thickness of the conductive coating thereon whereby a more rapid deicing and/or defogging of the electrically conductive window can be achieved.

If one desires to follow the first alternative, then one may achieve transmittance levels through the window, such as a laminated windshield, up to 75% or more of the light transmitted in the visible spectrum. The 75% transmittance level is the European standard. By that we mean that windshields produced for European markets must transmit at least 75% or more of the light incident thereon in the visible spectrum in order to be acceptable. Windshields which have only a 70% transmittance in the visible spectrum, although acceptable for the U.S. market, are not acceptable for European markets. However, by following the method of our invention, the same thickness coating of electrically conductive material that will produce 70% transmittance in an electrically heated window such as a windshield for the U.S. market will now produce 75% transmittance in the visible spectrum and will be suitable for sale in European markets.

In the alternative, here in the U.S. where 70% transmittance of light in the visible spectrum is acceptable for a laminated windshield, the thickness of the conductive coating on such a windshield may be increased when the electrically heated windshield is made in accordance with our invention. Even though a thicker coating of conductive material is now used in the electrically heated windshield, the overall transmittance stays at 70% or more if the method of our invention is followed. In such a case, more current may be flowed through the thicker conductive coating associated with the electrically heated windshield, and the windshield will be more rapidly defrosted and/or deiced.

In summary, our method is one which improves the transmittance of an electrically heated window, such as a windshield, having a given thickness of conductive coating thereon, or, if one desires the same transmittance in an electrically heated window, such as a windshield, a thicker coating of conductive material may be placed thereon. The product produced by our improved method is also of value since its transmittance of light in the visible wavelength is increased over that which it would have if our method had not been applied thereto.

No search was conducted in the U.S. Patent and Trademark Office or in any other search facility on the subject matters disclosed herein as our inventions.

BRIEF DESCRIPTION OF THE DISCLOSURE

This invention relates to a method of making an electrically heated window and product produced thereby. The invention has particular utility for making electrically heated windows such as windshields for automotive vehicles.

As disclosed herein, the method of making an electrically heated window is one wherein there is an improvement in the overall transmittance of light in the visible wavelength through the electrically heated window.

In general, the method of making an electrically heated window is one wherein a pair of glass sheets are laminated together by an interposed laminating interlayer. The laminating operation is carried out in a manner such that (I) a first of the pair of glass sheets defines both a first glass surface forming the outside surface of the window and a second glass surface in juxtaposition with the laminating interlayer, and (II) a second of the pair of glass sheets defines both a third glass surface in juxtaposition with the laminating interlayer and a fourth glass surface forming the inside surface of the window. An electrically conductive coating is formed in association with one of the glass surfaces in juxtaposition with the laminating interlayer.

In accordance with the teachings of a preferred embodiment of our invention, the method is improved by forming at least one sol-gel antireflective coating on at least one of the glass surfaces. The sol-gel antireflective coating improves the overall transmittance of light in the visible wavelength through the electrically heated window. Thus, if the same thickness of conductive coating is used, the overall transmittance of the window in the visible spectrum is improved. On the other hand, if the same transmittance characteristics are desired for the window, the thickness of the conductive coating may be increased so that more electrical energy may be flowed therethrough.

In accordance with various embodiments of our method, the electrically conductive coating is formed in association with the second glass surface and the sol-gel antireflective coating is formed on one of the glass surfaces in juxtaposition with the laminating interlayer. In another embodiment of the method of our invention, the sol-gel antireflective coating is formed on the second glass surface between that second glass surface and the electrically conductive coating associated with the second glass surface. In still another embodiment of our method, the sol-gel antireflective coating is formed on more than one of the glass surfaces other than the first glass surface.

Our invention also discloses an electrically heated window wherein a pair of glass sheets are laminated together by an interposed laminating interlayer. The laminating operation is carried out in a manner such that (I) a first of the pair of glass sheets defines both a first glass surface forming the outside surface of the window and a second glass surface in juxtaposition with the laminating interlayer, and (II) a second of the pair of glass sheets defines both a third glass surface in juxtaposition with the laminating interlayer and a fourth glass surface forming the inside surface of the window. An electrically conductive coating is associated with one of the glass surfaces in juxtaposition with the laminating interlayer.

Our invention teaches an improved electrically heated window comprising at least one sol-gel antireflective coating formed on at least one of the glass surfaces. The sol-gel antireflective coating improves the overall transmittance of light in the visible wavelength through the electrically heated window.

As an embodiment of our improved electrically heated window, the electrically conductive coating is associated with a second glass surface and the sol-gel antireflective coating is formed on one of the glass surfaces in juxtaposition with the laminating interlayer. A specifically taught improved electrically heated window in accordance with our invention is one wherein the sol-gel antireflective coating is formed on the second glass surface between that second glass surface and the electrically conductive coating associated with the second glass surface.

Still another embodiment of the improved electrically heated window of our invention is one wherein the sol-gel antireflective coating is formed on more than one of the glass surfaces other than the first glass surface. In particular, an improved electrically heated window of this design can be one wherein the sol-gel antireflective coating is formed on both the second glass surface and the third glass surface.

BRIEF DESCRIPITON OF THE DRAWINGS

Figure 2:
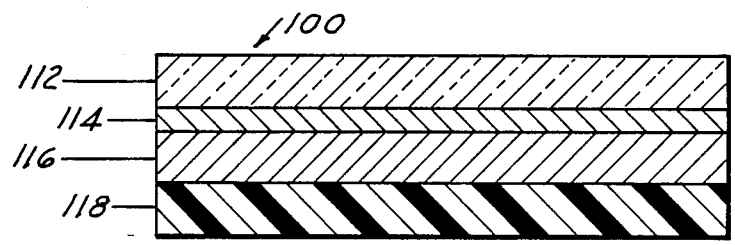

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings in which the electrically heated window is, in the preferred embodiment, an electrically heated windshield, and in which:

FIG. 1 is a pictorial view, in cross-section, of an electrically heated windshield (EHW) manufactured by our method so that the EHW having a conductive coating thereon has an improved transmittance in the visible wavelength therethrough; and FIG. 2 is a pictorial view, in cross section, of an EHW manufactured in accordance with a method of our invention in which the improvement of the transmittance in the visible wavelength through the EHW is offset by increasing the overall thickness of the conductive coating of the EHW thereby to achieve the same overall visible transmittance as was achieved previously with a thinner conductive coating on such an EHW.

BEST MODE AND INDUSTRIAL APPLICABILITY

The following description is what we consider to be preferred embodiments of the methods of our invention for making electrically heated windows, such as electrically heated windshields (EHW). The description also sets forth our inventive electrically heated windows. The remaining description will describe the electrically heated windows as being an EHW. However, such windows may be used in many applications, both within and without the automotive industry. However, for the purpose of simplification, the remaining specification will describe, as the preferred embodiment, the manufacture of an EHW.

The description contained in this specification is not intended to be a limitation upon the broader principles of these constructions and, while preferred materials are used in the EHW constructions, it does not mean that other materials cannot be used to make those constructions.

The inventive method and inventive product produced thereby has particular utility in the field of laminated structures. By laminated structures, we mean glass windows having a pair of glass sheets laminated together by an interposed laminating interlayer in a manner well known to those skilled in the art.

The inventions have particular utility in this laminated glass window field because when two sheets of glass are used to form a laminated window, the second glass sheet reduces the transmission of light in the visible wavelength therethrough by a matter of about 8%. The 8% loss in transmission of visible light comes about because of the optical losses of transmission associated with movement of the light through the two surfaces of the second glass sheet. The loss of transmission in visible light is about 4% at each surface of the second glass sheet, adding up to the total of about 8% loss of transmission. This loss of 8% can be of significant value when one is manufacturing laminated glass windows for European applications where an overall transmission level for a window, such as a windshield, must be 75% or more.

In FIG. 1 there is seen an electrically heated window, such as an electrically heated windshield (EHW), generally identified by the numeral 10. This EHW is made in accordance with the teachings of our inventive method to produce the improved product of our invention. The EHW is formed on a glass sheet 12. The glass sheet is normally formed from a soda/lime silica glass which may be manufactured in a process such as the float process for manufacturing glass. A sol-gel antireflective coating 14 is placed on one surface of the glass sheet 12. In accordance with a preferred embodiment of this invention, the sol-gel coating is formed by a multilayer film. In the preferred embodiment described herein, there are three layers making up the sol-gel coating 14. The total thickness of the sol-gel coating is approximately $9.21 \times 10^{-6}$ inches. The three layers forming the preferred sol-gel coating are formed from different materials which will be described hereinbelow.

The multilayer film used to form the sol-gel coating 14 is made up, in the preferred embodiment, from three different solutions. These solutions are so-called $SiO_2$ layer forming solution, the $TiO_2$ layer forming solution, and the $SiO_2$—$TiO_2$ layer forming solution. In the application of each solution, the surface of the glass sheet 12 to be coated is dipped in that solution. The viscosity of the solution and the rate of withdrawal of the dipped glass sheet from the solution are controlled so that when one places a surface of a glass sheet in the appropriate solution, and then withdraws the surface of the sheet from the solution, sufficient solution remains on the surface of the glass sheet that when it is consolidated and hardened it will have a thickness of about ¼ optical wavelength. A skilled artisan rapidly learns to control the viscosity of the applied sol-gel solution and the withdrawal rate from that solution in order to get the appropriate thickness of sol-gel coating on the surface of the glass. Appropriate measuring instruments may be employed to measure the thickness of the sol-gel coating so that one is assured that the ¼ optical wavelength thickness is achieved.

In accordance with the teachings of a preferred embodiment of the method of our invention, the $SiO_2$ layer is the first layer applied. The $SiO_2$ layer forming solution is made by adding one mol of tetraethylorthosilicate to a mixture containing 20.3 mols of reagent alcohol, 3.0 mols of water, and 0.005 mols of nitric acid (70% by weight). The mixture is put together while being stirred vigorously. This $SiO_2$ layer forming solution is stirred for an additional period of time in a capped plastic container in order to ensure that the solution is homogeneous. After several days stirring in the capped plastic container, for example, for about one week in time, the solution is aged sufficiently to be used to prepare a dense $SiO_2$ layer on a surface of a glass sheet as will be described below in order to develop the sol-gel coating 14.

A stabilized $TiO_2$ layer forming solution is prepared in the manner described in U.S. Pat. No. 4,346,131. This patent issued on Aug. 24, 1982, and is entitled "Polymer Raised Solution For Depositing Optical Oxide Coatings". Once prepared, the stabilized $TiO_2$ layer forming solution is used as will be described below in order to develop the sol-gel coating 14 on one surface of the glass sheet 12.

A $SiO_2$—$TiO_2$ layer forming solution is prepared in the following manner. Quantities of the previously prepared $SiO_2$ layer forming solution and the previously prepared $TiO_2$ layer forming solution are mixed in a suitable ratio desired for a specific application. In this preferred embodiment, the mixed $SiO_2$—$TiO_2$ layer forming solution is one in which the materials are present 50% by weight each in the combined solution. This combined solution will be used as described below to develop the sol-gel coating 14 on the glass sheet 12.

As previously stated, the sol-gel coating 14 is made up of a multilayer film. The sol-gel coating is applied to a surface of the glass sheet 12. As previously stated, the multilayer film forming the sol-gel coating is, in the preferred embodiment, a three-layer film. The first layer to be deposited on the glass sheet 12 is the $SiO_2$—$TiO_2$ binary layer. The second layer to be deposited on top of the previous layer is the $TiO_2$ layer. The final layer deposited on top of the previous two layers is the $SiO_2$ layer.

In order to deposit the sol-gel coating 14, the following steps are carried out. As previously stated, the viscosity of each film-forming solution is controlled and the rate of withdrawal of the glass sheet to be coated from the coating solution is controlled so that the thickness of each of the three layers is equal to a ¼ optical wavelength. The thickness of each layer is different because of the index of refraction of each particular layer is different thus causing a difference in the ¼ optical wavelength thickness for each of the different layers.

The $SiO_2$—$TiO_2$ binary layer is first deposited on the glass sheet 12 by dipping the glass sheet in the appropriate solution and slowly withdrawing the same therefrom. As previously stated, a skilled artisan can control the viscosity of the solution and the withdrawal rate of the glass sheet so that the resultant binary layer formed after consolidation and hardening has a thickness of about $3.1 \times 10^{-6}$ inches. After this first layer is deposited, a heating and cooling program is used to consolidate and harden the layer to the final desired thickness of the previously stated ¼ optical wavelength.

The layer consolidation and hardening involves heating and cooling the layer at approximately 2° C. per minute with a one hour soak at 400° C.. In other words, the layer is heated at a rate from room temperature to 400° C. at 2° C. per minute, held at 400° C. for one hour, and then cooled back to room temperature at a rate of 2° C. per minute until room temperature is reached.

The second layer is deposited on top of the first layer and is the $TiO_2$ layer. This second layer has, after consolidation and hardening, a thickness of about $2.5 \times 10^{-6}$ inches. Once again, this layer is consolidated and hardened to the first applied layer by the heating and cooling program described above wherein the layer is heated at approximately 2° C. per minute to and from a holding temperature of 400° C. where a one hour soak takes place.

The final layer deposited on top of the previous two layers is the $SiO_2$ layer. This $SiO_2$ layer has a thickness of about $3.68 \times 10^{-6}$ inches. This layer is consolidated and hardened on the previous two applied layers in the same manner described above for the previously applied layers. In this manner, the sol-gel coating 14 of a preferred embodiment is placed on the glass sheet 12. The total thickness of the sol-gel coating is about $9.21 \times 10^{-6}$ inches as has been described above.

After the sol-gel coating 14 has been placed on the glass sheet 12, an electrically conductive coating 16 is placed thereon. In the preferred embodiment, the electrically conductive coating is applied by a magnetron sputtering operation. Magnetron sputtering of a coating material on a suitable substrate is well known in the art.

In accordance with the teachings of a preferred embodiment of this invention, the materials used as target materials in the magnetron sputtering apparatus are zinc and silver and the resulting coating applied to the glass sheet is a multilayer coating consisting of zinc oxide, silver and zinc oxide. This resulting coating is electrically conductive. By electrically conductive, I mean that electric current, either AC or DC, can be passed through the silver-containing coating.

While not shown in the drawings, suitable electric bus bars are also placed on the conductive coating 16 as, for example per the teachings of aforementioned U.S. Pat. No. 4,543,466, so that electrical connection may be made to the conductive coating. Such bus bars are generally made from a silver ceramic material as is known in the art. The bus bars formed of this material are applied to a surface of the EHW 10 by a silk screen printing operation. Normally, the bus bars are printed and the printing material used is liquid. The liquid material is dried in a suitable dryer so that the final bus bars are bonded to a surface of the EHW having the conductive coating.

The manufacture of the so-coated glass sheet 12 is then completed in order to form the EHW 10. One way of completing the manufacture is a laminated type construction. In such a case, a suitable laminating interlayer 18 and a second glass sheet 20 are bonded to the glass sheet 12 and the coatings 14 and 16 thereon. The coatings 14 and 16 are bonded so that they are within the middle of the laminated sandwich. This is the preferred construction of our invention. Since the laminating of a laminating interlayer 18 and the second glass sheet 20 to the coated first glass sheet 12 is a well known operation to those skilled in the art, no further discussions thereof will be undertaken herein. Leads, not shown, would also have to be attached to the bus bars, not shown, on the conductive coating 16 so that electrical energy may be supplied thereto.

Preferably, in the laminated construction, the conductive coating 16 is located in juxtaposition to the laminating interlayer 18. In this manner, the conductive coating is protected from the weather and other abrasive contact and is thus protected during its useful life. The preferred position for the conductive coating is in juxtaposition to the surface of the glass sheet 12 which faces the laminating interlayer 18.

The preferred position for the sol-gel coating 14 is between the conductive coating 16 and the surface of the glass sheet 12 which faces the interlayer 18. However, the sol-gel coating may, in the laminated structure, go on other surfaces of the glass sheet, but it is preferably located as aforementioned or on either surface of the glass sheet 20.

In accordance with both the preferred embodiment of the method of our invention disclosed above, and the preferred embodiment of our electrically heated window disclosed above, the sol-gel coating 14 improves the visible transmittance of the EHW 10. Thus, an EHW having the same thickness of electrically conductive coating 16 placed thereon as previously placed on a non-sol-gel coated glass will now have a higher transmittance because of the placement of the sol-gel coating in accordance with our inventive method in order to form the electrically heated window of our invention. In other words, if the transmittance of the uncoated product was in the range of 70% of the visible light, the sol-gel coated product, in accordance with the teachings of our method, would have a visible transmittance in the range of approximately 75% with the same thickness of electrically conductive coating 16 thereon. Thus, a windshield which would not have been acceptable for sale in European markets wherein 75% transmittance is required, now becomes acceptable for such sale because of the method of our invention.

In FIG. 2 there is seen the results of carrying out an alternate embodiment of the method of our invention to product an electrically heated window in accordance with the teachings of our invention. In this alternate embodiment, the electrically heated windshield (EHW), generally identified by the numeral 100, will have the same transmittance, for example 70%, as a non-sol-gel coated EHW would have, but will have a greater thickness of electrically conductive coating thereon.

Once again, in accordance with this alternate form of the method of our invention, a glass sheet 112 is selected. This glass sheet 112 has a sol-gel coating 114 placed thereon. The glass sheet has a thickness of 0.09 inch in this preferred embodiment and, once again, the sol-gel coating has a thickness of about $9.21 \times 10^{-6}$ inches. The sol-gel coating 114 is placed on the glass sheet 112 in a manner as described previously with respect to the sol-gel coating 14 of the EHW 10 of FIG. 1.

However, because of the sol-gel coating 114, a greater thickness of electrically conductive coating 116 may be placed on the sol-gel coating. For example, as described in FIG. 1, the electrically conductive coating therein had zinc oxide layers surrounding a silver layer. In that case, each of the zinc oxide layers have a thickness of about $1.77 \times 10^{-6}$ inches and the silver layer had a thickness of about $4.53 \times 10^{-6}$ inches. However, in this case, where the thickness of the electrically conductive coating 116 can be increased, the zinc oxide layers have a thickness of about $1.77 \times 10^{-6}$ inches and the silver layer had a thickness of about $7.87 \times 10^{-6}$ inches. Since the thickness of the silver of the conductive coating has been increased, it is apparent that the electrically conductive coating may now carry more electrical energy therethrough and thus decrease the time required to defog and/or deice the EHW 100.

The completion of the so-coated glass sheet 112 into an electrically heated windshield 100 is accomplished in this embodiment by the application of an antilacerative layer 118 over the electrically conductive coating 116. The antilacerative layer 118 may be made up of a plurality of different layers of material as is well known in the art. The antilacerative layer 118 is bonded directly to the electrically conductive coating. Of course, as with the embodiment shown in FIG. 1, suitable bus bars, not shown, and electric leads, not shown, need be applied to the electrically conductive coating so that electrical energy may flow therethrough. On the other hand, if desired, one may finish the EHW 100 shown in FIG. 2 by using a laminating interlayer and the second glass sheet instead of the antilacerative layer.

While particular embodiments of the invention have been illustrated and described, it will be obvious to those skilled in the art that various changes and modifications may be made to the methods of our invention and products produced thereby without departing from the invention. For example, the conductive coating and sol-gel coating could be applied to a single sheet of transparent glass and would be useful as a heatable rear window for an automobile. The appended claims cover modifications and equivalents as fall within the true spirit and scope of this invention.

We claim:

1. In a method of making an electrically heated window wherein: a pair of glass sheets are laminated together by an interposed laminating interlayer in a manner that (I) a first of said pair of glass sheets defines both a first glass surface forming the outside surface of the window and a second glass surface in juxtaposition with said laminating interlayer, and (II) a second of said pair of glass sheets defines both a third glass surface in juxtaposition with said laminating interlayer and a fourth glass surface forming the inside surface of the window; and wherein an electrically conductive coating is formed in association with one of said glass surfaces in juxtaposition with said laminating interlayer; the improvement comprising:

forming at least one sol-gel antireflective coating on at least one of said glass surfaces other than said first glass surface, said sol-gel antireflective coating improving the overall transmittance of light in the visible wavelength through the electrically heated window.

2. The improved method of making an electrically heated window of claim 1 wherein: said electrically conductive coating is formed in association with said second glass surface, and wherein said sol-gel antireflective coating is formed on one of said glass surfaces in juxtaposition with said laminating interlayer.

3. The improved method of making an electrically heated window of claim 2 wherein: said sol-gel antireflective coating is formed on said second glass surface between that second glass surface and said electrically conductive coating associated with that second glass surface.

4. The improved method of making an electrically heated window of claim 1 wherein: said sol-gel antireflective coating is formed on more than one of said glass surfaces other than said first glass surface.

5. The improved method of making an electrically heated window of claim 4 wherein: said sol-gel antireflective coating is formed on said second glass surface and said third glass surface.

6. In a method of making an electrically heated window wherein: a pair of glass sheets are laminated together by an interposed laminating interlayer in a manner such that (I) a first of said pair of glass sheets defines both a first glass surface forming the outside surface of the window and a second glass surface in juxtaposition with the laminating interlayer, and (II) a second of said pair of glass sheets defines both a third glass surface in juxtaposition with said laminating interlayer and a fourth glass surface forming the inside surface of the window; and wherein an electrically conductive coating is formed in association with one of said glass surfaces in juxtaposition with said laminating interlayer; the improvement comprising:

forming at least one sol-gel antireflective coating on at least one of said glass surfaces other than the first glass surface, said sol-gel antireflective coating improving the overall transmittance of light in the visible wavelength through the electrically heated window, said sol-gel antireflective coating being a three-layer film with the first layer thereof in contact with the glass being formed of $SiO_2$—$TiO_2$ having a thickness of about $3.01 \times 10^{-6}$ inches, the second layer being formed of $TiO_2$ having a thickness of about $2.52 \times 10^{-6}$ inches, and the third layer being formed of $SiO_2$ having a thickness of about $3.68 \times 10^{-6}$ inches.

7. In an electrically heated window wherein: a pair of glass sheets are laminated together by an interposed laminating interlayer in a manner that (I) a first of said pair of glass sheets defines both a first glass surface forming the outside surface of the window and a second glass surface in juxtaposition with said laminating interlayer, and (II) a second of said pair of glass sheets defines both a third glass surface in juxtaposition with said laminating interlayer and a fourth glass surface forming the inside surface of the window; and wherein an electrically conductive coating is associated with one of said glass surfaces in juxtaposition with said laminating interlayer; the improvement comprising:

at least one sol-gel antireflective coating formed on at least one of said glass surfaces other than said first glass surface, said sol-gel antireflective coating improving the overall transmittance of light in the visible wavelength through the electrically heated window.

8. The improved electrically heated window of claim 7 wherein: said electrically conductive coating is associated with said second glass surface, and wherein said sol-gel antireflective coating is formed on one of said glass surfaces in juxtaposition with said laminating interlayer.

9. The improved electrically heated window of claim 8 wherein: said sol-gel antireflective coating is formed on said second glass surface between that second glass surface and said electrically conductive coating associated with that second glass surface.

10. The improved electrically heated window of claim 7 wherein: said sol-gel antireflective coating is formed on more than one of said glass surfaces other than said first glass surface.

11. The improved electrically heated window of claim 10 wherein: said sol-gel antireflective coating is formed on both said second glass surface and said third glass surface.

12. In an electrically heated window wherein: a pair of glass sheets are laminated together by an interposed laminating interlayer in a manner that (I) a first of said pair of glass sheets defines both a first glass surface forming the outside surface of the window and a second glass surface in juxtaposition with said laminating interlayer, and (II) a second of said pair of glass sheets defines both a third glass surface in juxtaposition with said laminating interlayer and a fourth glass surface forming the inside surface of the window; and wherein an electrically conductive coating is associated with one of said glass surfaces in juxtaposition with said laminating interlayer; the improvement comprising:

at least one sol-gel antireflective coating formed on at least one of said glass surfaces other than said first glass surface, said sol-gel antireflective coating improving the overall transmittance of light in the visible wavelength through the electrically heated window, said sol-gel antireflective coating being a three-layer film with the first layer thereof in contact with the glass sheet being formed of $SiO_2$—$TiO_2$ having a thickness of about $3.01 \times 10^{-6}$ inches, the second layer being formed of $TiO_2$ having a thickness of about $2.52 \times 10^{-6}$ inches, and the third layer being formed of $SiO_2$ having a thickness of about $3.68 \times 10^{-6}$ inches.

13. An electrically heated window having at least one glass sheet and a plurality of material layers;

said glass sheet having a glass surface;

said plurality of material layers being positioned adjacent said glass surface;

one of said layers comprising an electrically conductive coating and another of said layers comprising a sol-gel antireflective coating;

said sol-gel antireflective coating when in the presence of said electrically conductive coating permitting greater transmittance of visible light through said electrically heated window than would occur if it were not present.

14. An electrically heated window having first and second glass sheets;

said glass sheets having glass surfaces arranged in facing relationship;

a plurality of material layers positioned between said glass surfaces;

one of said glass layers comprising an electrically conductive coating and another one of said layers comprising a sol-gel antireflective coating;

said sol-gel antireflective coating when in the presence of said electrically conductive coating permitting greater transmittance of visible light through said electrically heated window than would occur if it were not present.

* * * * *